Nov. 29, 1966     J. A. GINSBERG     3,289,044
SLIDABLE TERMINAL CONTACTOR
Filed April 21, 1965
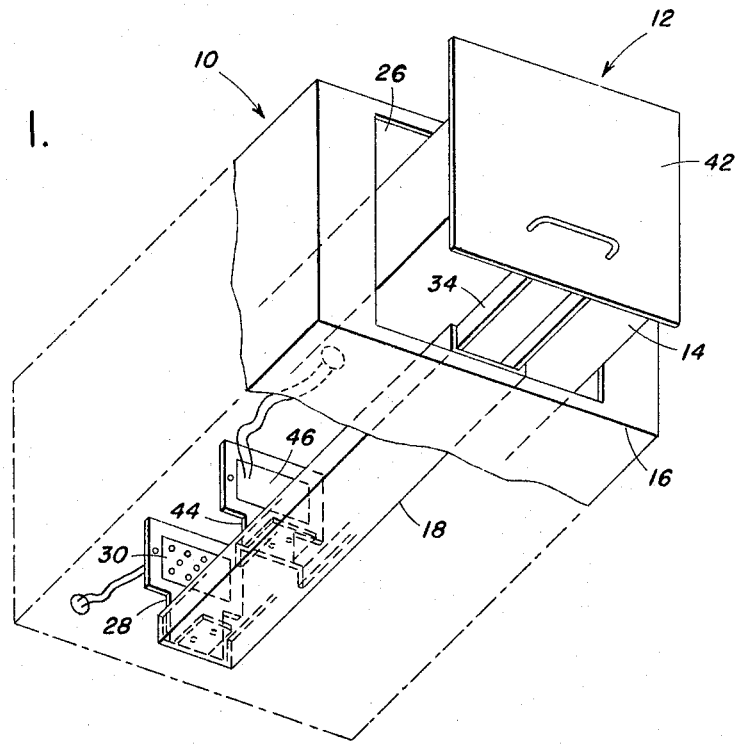
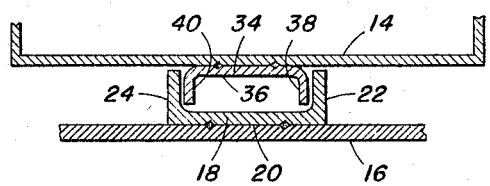
Fig. 3.
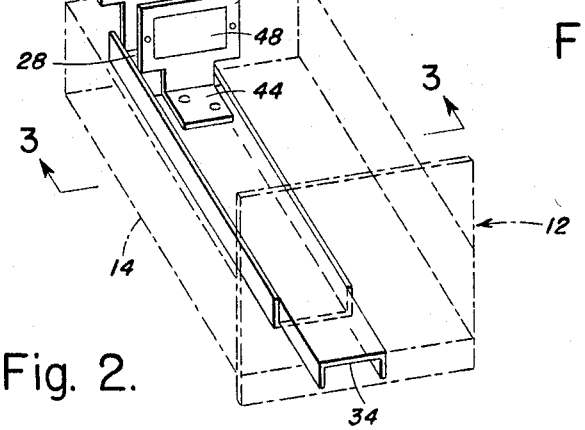
Fig. 2.
INVENTOR
Julius A. Ginsberg
BY
ATTORNEY

United States Patent Office 3,289,044
Patented Nov. 29, 1966

3,289,044
SLIDABLE TERMINAL CONTACTOR
Julius A. Ginsberg, Maplewood, N.J., assignor to American Radiator & Standard Sanitary Corporation, New York, N.Y., a corporation of Delaware
Filed Apr. 21, 1965, Ser. No. 449,813
3 Claims. (Cl. 317—99)

This invention pertains to electrical connectors and more particularly to electrical connectors used with plug-in chassis.

Most present day electronic instruments are of modular design. In such instruments a plurality of plug-in units are mounted in a rack or instrument frame. Each plug-in unit is a separate module. The concept of modular design facilitates trouble shooting and repair. Generally, at the installation, it is only necessary to remove a defective unit and replace it with an identical trouble-free unit. The defective unit can then be repaired at any convenient time. Since plug-in units are designed to be removable it is necessary to provide mating connectors for the plug-in unit and the instrument frame so that the electronic circuits of the plug-in unit may be detachably connected to the wiring harness of the instrument.

One of the major problems in designing a plug-in unit for an electronic instrument is the alignment of mating connectors. The usual method of mating connectors is to use guide pins which are fastened to or supplied with the connectors. The connectors are then mounted to the rear of the instrument and the rear of the plug-in unit. This application of mounting has an alignment problem due to the usual build up in tolerances. The differences in tolerances take place when the female connector is mounted to the frame's rear panel which has its own tolerances and the male connector is mounted to the plug-in unit which also has its own tolerances. This condition can build up considerably if the tolerances are all on the plus side or, the reverse, on the minus side. Misalignment can cause faulty functioning of the instrument and sometimes no function at all.

It is, therefore, a general object of the invention to provide an improved electrical contactor for use with an electrical component chassis such as a plug-in unit which is removably mountable in the chassis rack of an electronic instrument.

It is another object of the invention to provide an improved slidable terminal connector for use with an electrical component chassis that is removably mountable in a chassis rack which minimizes the usual connector alignment problems.

Briefly, the invention contemplates a slidable terminal contactor for use with an electrical component chassis which is removably mountable in a chassis rack. The contactor comprises a first slide member fixed to the chassis rack, and a second slide member fixed to the component chassis. The slide members are disposed so that the first slide member is slidingly guided to move only longitudinally over the second slide member. A connector is fixed to and extends laterally from one end of the first slide member. A mating connector is fixed to and laterally extends from a corresponding end of the second slide member. The connectors are mutually aligned through the agency of the slide members so that when the electrical component chassis is fully inserted into the chassis rack the connectors mutually engage each other.

Other objects, the features and advantages of the invention will in part be obvious and will in part appear hereinafter.

The invention, accordingly, comprises the features of construction, combination of elements and arrangement of parts which will be exemplified in the construction hereinafter set forth and the scope of the invention will be indicated in the claims.

For a further understanding of the nature and objects of the invention, the following description should be read with the accompanying drawing, in which:

FIG. 1 is a perspective view of a portion of a chassis rack and housing of an instrument containing at least one plug-in electrical component chassis utilizing the electrical terminal contactor of the invention;

FIG. 2 is a perspective view showing, in detail, slide members and connectors of the electrical terminal contactor of FIG. 1; and FIG. 3 is an enlarged cross-section showing the details of the slide members and their connection to the chassis rack and electrical component chassis.

Referring now to FIGS. 1–3, there is shown a chassis rack and housing of an electronic instrument 10 and a removable electrical component chassis 12, idiomatically called a plug-in unit. Chassis 12 includes a base portion 14 on which are supported electrical components (not shown). Instrument 10 includes a base 16 on which is supported chassis 12.

Fixed to base 16, by means of screws or otherwise, is an elongated channel-like slide member 18. Member 18 includes a base portion 20 (FIG. 3) and arm portions 22 and 24 which extend upwardly from base 16. At the end of slide member 18, remote from the opening 26 of the housing, is an L-bracket 28, connected to base portion 20, which laterally supports a female connector 30. Female connector 30 includes a plurality of receptacles 32 whose axes are parallel to the longitudinal axis of slide member 18.

An inner or second slide member 34 in the form of an elongated channel-like member is fixed to the base portion 14 of chassis 12. Slide member 34 includes a base portion 36, screwed or otherwise fixed to base portion 14, and arm portions 38 and 40 extending in a downward direction from base portion 14. At the end of slide member 34, remote from opening cover 42, is an L-bracket 44, connected to base portion 36, which laterally supports a male connector 46. Male connector 46 includes a plurality of pins 48 whose back portions are shown. The axes of pins 48 are parallel to the longitudinal axis of slide member 34. By virtue of the geometry and dimensions of slide members 18 and 34, and L-brackets 28 and 44, pins 48 will engagingly enter receptacles 32 when chassis 12 is fully inserted into instrument 10.

In order to insure proper alignment of the pins 48 and the receptacles 32, the arm portions 38 and 40 of slide member 34 slide over base portion 20 of slide member 18, and the arm portion 40 slidingly moves against arm portion 24 and arm portion 38 slidingly moves against arm portion 22. The weight of chassis 12 and the sliding of arm portions 38 and 40 over base portion 20 insure that there will be no vertical misalignment of the connectors 30 and 46. The ratio of the length with respect to the width of slide members 18 and 34 and the mutual sliding movement of the arm portions insure no horizontal misalignment of the connectors 30 and 46.

Other variations within the scope of the invention will be apparent to those skilled in the art.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also be understood that the following claims are intended to cover all of the generic and specific features of the invention herein described, and all statements of the scope of the invention which, as a matter of language, might be said to fall therebetween.

What is claimed is:

1. For use with an electrical component chassis removably mountable in a chassis rack, the electrical component chassis including a base portion, a terminal contactor comprising: a first elongated channel-like slide member including a base portion fixed to the base portion of the electrical component chassis and arm portions integrally extending from the base portion thereof downwardly from the base portion of said electrical component chassis; a second elongated channel-like slide member including a base portion fixed to the chassis rack and arm portions integrally extending from the base portion thereof upwardly from the chassis rack; said slide members being disposed in opposed relationship so that the arm portions of one of said slide members slide over the base portion of the other of said slide members and the arm portions of said first slide member slidingly contact the arm portions of said second slide member to constrain said slide members to slidably move only longitudinally with respect to each other; a first connector fixed to and laterally extending from one end of the base portion of said first slide member; and a mating connector fixed to and laterally extending in the same direction as said first connector from a corresponding end of the base portion of said second slide member; said connectors being mutually aligned through the agency of said slide members so that when the electrical component chassis is fully inserted into the chassis rack said connectors mutually engage each other.

2. The slidable terminal contactor of claim 1 wherein one of said connectors is a female connector including a plurality of female receptacles, the axis of each receptacle being parallel to the longitudinal direction of movement of the slide member fixed to the electrical component chassis, and the other of said connectors is a male connector including a plurality of pins, the axis of each pin being parallel to said longitudinal direction.

3. The slidable terminal contactor of claim 2 wherein said female connector is fixed to the slide member fixed to the chassis rack, and said male connector is fixed to the slide member fixed to the electrical component chassis.

References Cited by the Examiner
UNITED STATES PATENTS

| | | | |
|---|---|---|---|
| 1,508,259 | 9/1924 | Stafford | 312—346 X |
| 2,609,286 | 9/1952 | Nye | 317—101 X |

FOREIGN PATENTS

| | | |
|---|---|---|
| 1,366,567 | 6/1964 | France. |
| 936,293 | 9/1963 | Great Britain. |

ROBERT K. SCHAEFER, *Primary Examiner.*

M. GINSBURG, *Assistant Examiner.*